(12) United States Patent
Gaubert

(10) Patent No.: US 7,107,897 B2
(45) Date of Patent: Sep. 19, 2006

(54) DEVICE FOR INERTING A VAT FOR CONSUMABLE LIQUID, IN PARTICULAR WINE

(75) Inventor: Guy Gaubert, Cameyrac (FR)

(73) Assignee: L'air Liquide Societe Anonyme pour l'Etude et l'Explotation des Procedes Gerges Claude, Paris (FR)

( * ) Notice: Subject to any disclaimer, the term of this patent is extended or adjusted under 35 U.S.C. 154(b) by 198 days.

(21) Appl. No.: 10/700,854

(22) Filed: Nov. 5, 2003

(65) Prior Publication Data

US 2004/0091591 A1 May 13, 2004

Related U.S. Application Data

(62) Division of application No. 08/978,055, filed on Nov. 25, 1997.

(30) Foreign Application Priority Data

Nov. 29, 1996 (FR) .................................. 96 14690

(51) Int. Cl.
B65B 31/04 (2006.01)
B65B 63/08 (2006.01)

(52) U.S. Cl. ...................... 99/323.2; 141/18; 141/105; 141/369

(58) Field of Classification Search ............... 99/323.1, 99/323.2; 141/369, 18, 90, 94, 98, 104, 105, 141/82

See application file for complete search history.

(56) References Cited

U.S. PATENT DOCUMENTS

| 597,955 A | 1/1898 | Ciani |
| 917,728 A | 4/1909 | Hare |
| 1,035,127 A | 8/1912 | Windemuller |
| 2,978,187 A | 4/1961 | Hesson |
| 2,985,385 A | 5/1961 | Bowers et al. |
| 3,379,344 A | 4/1968 | Cornelius |
| 3,814,147 A * | 6/1974 | Lindberg .................... 141/94 |
| 4,835,937 A * | 6/1989 | Meyer et al. ................. 53/88 |
| 4,870,801 A * | 10/1989 | Mizandjian et al. .......... 53/432 |
| 4,901,887 A | 2/1990 | Burton |
| 4,911,212 A * | 3/1990 | Burton ....................... 141/369 |
| 5,452,563 A * | 9/1995 | Marano et al. ............... 53/432 |
| 5,604,297 A | 2/1997 | Seiden et al. |

FOREIGN PATENT DOCUMENTS

| DE | 27 44 767 | 4/1979 |
| DE | 252584 | 12/1987 |
| FR | 928053 | 11/1947 |

(Continued)

OTHER PUBLICATIONS

Derwent Publication Ltd., London, GB JP 03 058 778, Mar. 1991.
Lewis, D., Blanketing in Storage Tanks the Australian Grapegrower and Winemaker, Apr. 1990.

(Continued)

Primary Examiner—Reginald L. Alexander
(74) Attorney, Agent, or Firm—Buchanan Ingersoll & Rooney

(57) ABSTRACT

A method and device for inerting a vat having an upper wall and containing a consumable liquid and an overhead gas, including the steps of:
injecting an inerting gas heavier than air by way of a downward extending injection tube into the overhead gas above a free surface of the liquid and substantially below the upper wall of the vat and, during this injection,
removing excess gas through the injection tube and a purge orifice of the vat. The injection tube may have a gas diffuser at its lower end.

14 Claims, 2 Drawing Sheets

| | FOREIGN PATENT DOCUMENTS | |
|---|---|---|
| FR | 2107946 | 5/1972 |
| FR | 2516483 | 11/1981 |
| FR | 365563 | 12/2005 |
| GB | 1371027 | 10/1974 |
| GB | 1408995 | 12/1975 |
| WO | 93/20181 | 10/1993 |

OTHER PUBLICATIONS

Westrick, M., Managing oxygen in white wine production, Practical Winery and Vineyard, pp. 49-52, May/Jun. 1996.

Allen, D., Gas Diffuser proves beneficial, Winepress, p. 14, Jun. 1996.

* cited by examiner

DEVICE FOR INERTING A VAT FOR CONSUMABLE LIQUID, IN PARTICULAR WINE

CROSS REFERENCE TO RELATED APPLICATIONS

This application is a divisional of U.S. patent application Ser. No. 08/978,055, filed Nov. 25, 1997.

BACKGROUND OF THE INVENTION (i) Field of the Invention

The present invention relates to a method of inerting a vat containing a consumable liquid, in particular wine, of the type in which an inerting gas heavier than air is injected into the gas overhead of the vat and, during this injection, the excess gas is removed through a purge orifice of the vat.

(ii) Description of Related Art

In the current technique of inerting wine vats, the flushing with gas is carried out on vats provided with an orifice available for letting gas in, generally a lateral tap on the vent of the vat, and a purge orifice placed at the center of the hatch for accessing the vat.

In this case, it is possible to flush with gas by dilution with gases such as nitrogen or a nitrogen/$CO_2$ mixture.

However, this technique is not fully satisfactory, because a relatively long flushing process, consuming a large quantity of inerting gas, needs to be carried out in order to reach a sufficiently low residual oxygen level (typically less than 1%). Furthermore, this technique cannot be employed when the vat is provided with a single opening in its upper part, which is frequently the case.

SUMMARY AND OBJECTS OF THE INVENTION

The object of the invention is to allow rapid, reliable and economical inerting of wine vats, even ones provided with a single upper opening.

To this end, the invention relates to an inerting method of the aforementioned type, characterized in that the inerting gas is injected into the vat substantially below the upper wall of the vat and close to the free surface of the liquid.

The method according to the invention may include one or more of the following characteristics:

the velocity of the inerting gas close to the free surface of the liquid is reduced just before it is injected;

the oxygen level in the gas overhead of the vat is measured, and the injection is stopped when this level is less than or equal to a predetermined maximum value;

use is made of an inerting gas containing substantially 75 to 80% of a neutral gas, in particular argon, the remainder being carbon dioxide ($CO_2$).

The invention also relates to a device for inerting a vat for consumable liquid, in particular wine, intended for implementing such a method. This device, of the type comprising a source of an inerting gas heavier than air, an orifice, connected to this source, for letting gas into the vat, and an orifice for purging the vat, is characterized in that it comprises at least one downward injection tube intended to be connected via its upper end to the inlet orifice and extending to near the free surface of the liquid.

The device according to the invention may include one or more of the following characteristics:

the injection tube has a gas diffuser at its lower end;

the upper part of the injection tube is enclosed by the side wall of a tubular connector which can be fitted onto an upper opening of the vat, said side wall being provided with said purge orifice;

said side wall is provided with a second orifice to which a safety valve is connected;

the injection tube has an adjustable length;

said source contains a mixture of substantially 75 to 80% of a neutral gas, in particular argon, and of carbon dioxide.

The invention further relates to an inerting gas for consumable liquid, in particular wine, which can be used in the method and the device which are defined above. This inerting gas consists of substantially 75 to 80% of argon and of carbon dioxide, preferably of substantially 80% of argon and 20% of carbon dioxide.

BRIEF DESCRIPTION OF THE DRAWINGS

An illustrative embodiment of the invention will now be described with reference to the appended drawings, in which.

DETAILED DESCRIPTION OF PREFERRED EMBODIMENTS

Figure 1:
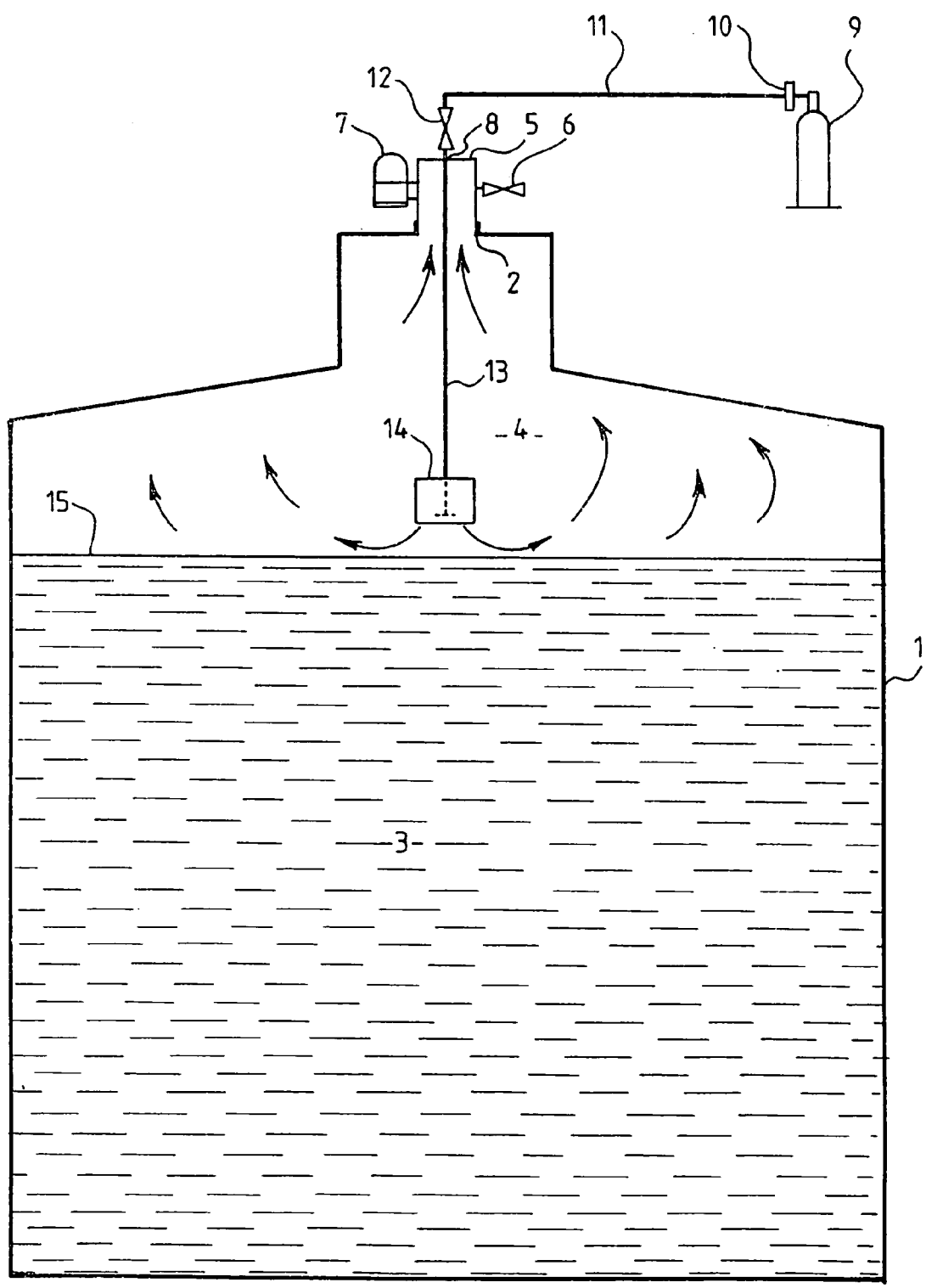
FIG. 1 schematically represents a wine vat equipped with an inerting device according to the invention.

The vat 1 schematized in FIG. 1, having a relatively large capacity of, for example, 150 hl, has a single tapped opening 2 in its upper part, this opening being normally closed by a conventional removable hatch of the Bellot type or similar (not shown). The vat contains a mass of wine 3 to be inerted, leaving a gas overhead 4 representing, for example, several $m^3$.

The lower part of a polyethylene connector 5 is screwed into the opening 2, this connector being provided at the side with a purge valve 6 and a safety valve 7 and, at the top, with an inerting gas inlet 8. The latter is connected, via a conduit 11 provided with a shut-off valve 12, to a bottle 9 which contains the inerting gas under pressure and is equipped with a pressure reducer 10. The pressure reducer 10 has two stages, namely a first stage which reduces the pressure to about 3 bar, and a second stage for reduction to about 20 mb (relative pressures).

A vertical extension tube 13, equipped at its lower end with a gas diffuser 14, passes through the connector 5 from bottom to top and is screwed via its upper end into the lower part of the gas inlet 8. As can be seen in FIG. 1, the diffuser 14 is located just above the free surface 15 of the wine.

Figure 2:
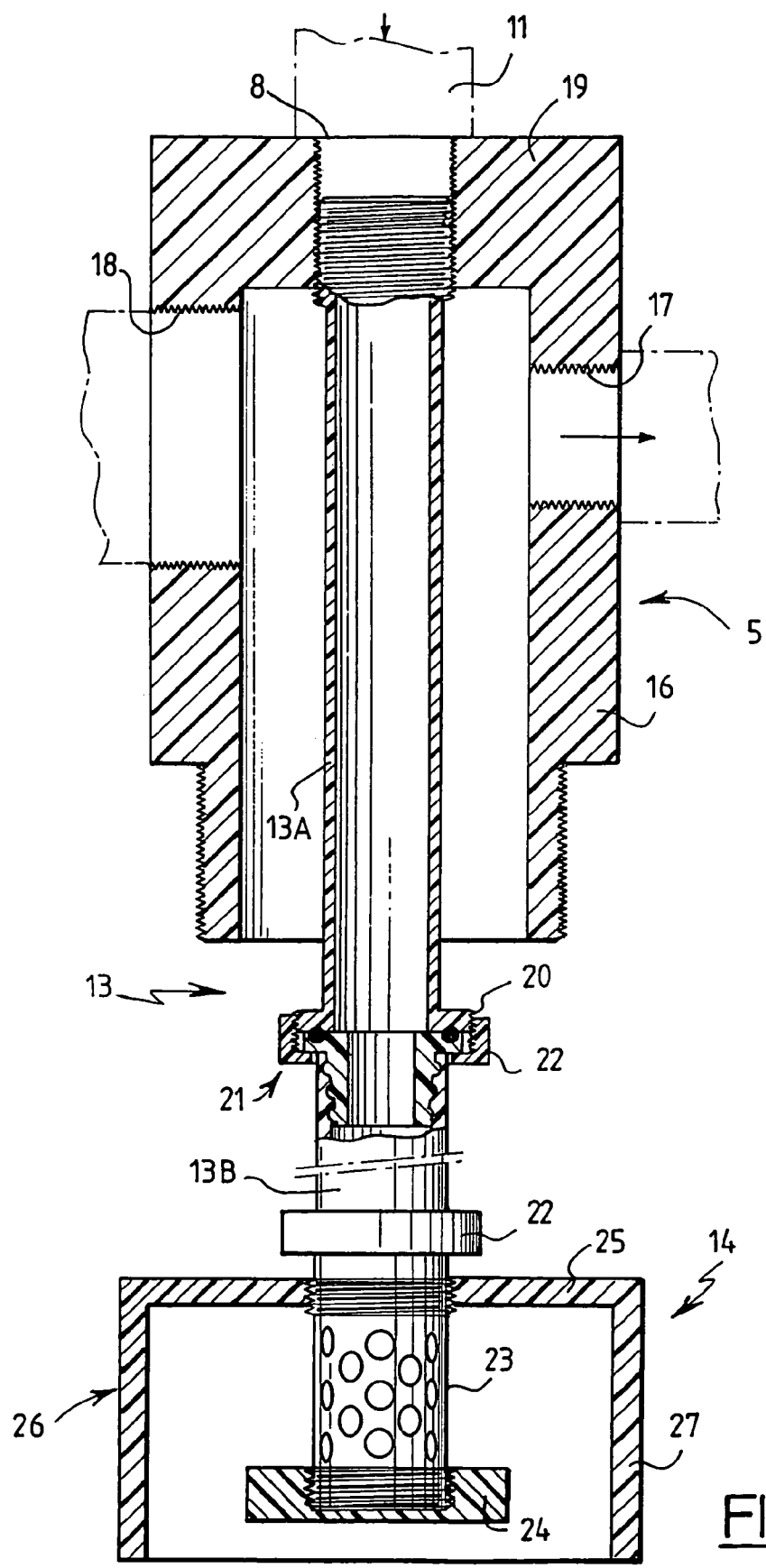
FIG. 2 represents a part of the inerting device, on a larger scale and partially in longitudinal section.

As can be seen in more detail in FIG. 2, the connector 5 has the shape of an inverted dish. Its side wall 16 is pierced by two diametrically opposite holes 17, 18 for connecting the purge valve 6 and the safety valve 7, respectively. Its upper end 19 is pierced by a tapped central hole constituting the gas inlet 8. The conduit 11 is connected to this hole at the top, and the upper end of the extension tube 13 is connected to this hole at the bottom.

In the example which is represented, the extension tube 13 is made in two parts: on the one hand, a fixed upper part 13A made of polyvinyl chloride (PVC) screwed into the inlet 8 via its upper end and extending downward below the connector 5, the lower end of this part 13A being equipped with a screw-threaded connection flange 20. On the other hand, an interchangeable lower part 13B consisting of a tube, also made of flexible PVC, equipped at each end with a connection device 21 having a knurled nut 22.

The diffuser 14 consists of a PVC tube whose part 23 is perforated, whose lower end is closed off by a horizontal plate 24 which is much larger in area than the cross section of the tube, and whose upper part, which is not perforated, is screwed through the upper end 25 of a bell 26. Above the end 25, the tube 23 ends in a screw-threaded connection flange similar to the flange 20. The skirt 27 of the bell 26 extends below the plate 24.

The bottle 9 contains a gas mixture consisting of 80% of argon and 20% of carbon dioxide ($CO_2$). The safety valve 7 is adjusted so as to open when a predetermined overpressure and a predetermined underpressure are reached, for example an overpressure of 45 mb and an underpressure of 5 mb. Furthermore, it is possible to sample the atmosphere in the vat at the purge valve 6 in order to measure the oxygen level in the gas overhead of the vat.

During operation, the vat being filled partially with wine to the extent indicated above, the valves 12 and 6 are opened. The argon/$CO_2$ mixture then enters the vat through the conduit 11, the tube 13 and the diffuser 14. The flow rate of the gas is adjusted by the overpressure brought about by the pressure reducer 10. This overpressure is typically about 20 mb, which gives a flow rate of the order of 200 l/min.

Upon reaching the vat, the gas essentially loses its velocity because of the diffuser 14, and is deposited gently on the free surface 15 of the wine. The build-up of gas on the wine causes a piston effect which flushes the air through the purge valve 6.

A particularly rapid reduction in the oxygen level is observed when performing a series of analyses by sampling the atmosphere of the gas overhead at the purge valve 6. Furthermore, the gas which is chosen proves to be a multipurpose gas: its $CO_2$ level is sufficient to keep white wines fresh, but low enough in order, by dissolving $CO_2$, to prevent "hardening" of red wines. Of course, this means that the gas in question is also suitable for the conservation of rose wines.

It should be noted that the arrangement of the connector 5, and in particular of the two concentric passages which it provides for inlet and outlet of the gas flows, allows optimum use of the cross section of the single upper opening 2 of the vat, and therefore the use of relatively high gas flow rates.

The invention claimed is:

1. A device for inerting a vat having an upper wall and a single upper opening and containing a consumable liquid and an overhead gas, said device comprising:
   a downward extending injection tube having an upper end adapted to be connected to said upper opening of the vat and a lower end extending close to a free surface of the consumable liquid in the vat;
   a tubular connector adapted to be fitted onto the upper opening of the vat, said connector having two concentric passages comprising an inlet for passage of an inerting gas, and an outlet for passage of the overhead gas and a side wall enclosing an upper portion of the injection tube, the side wall being provided with an orifice to purge the overhead gas, and
   a gas diffuser at the lower end of the injection tube.

2. The device according to claim 1, wherein the gas diffuser has a lower end closed off by a horizontal plate larger than the cross section of the injection tube and the inerting gas is injected through a perforated portion of the diffuser above the horizontal plate.

3. The device according to claim 1, further including a source of an inerting gas heavier than air connected to the injection tube.

4. The device according to claim 1, further including a safety valve connected to the side wall of the connector.

5. The device according to claim 1, wherein the injection tube is adjustable in length.

6. The device according to claim 1, wherein the consumable liquid is wine.

7. The device according to claim 1, wherein the inerting gas comprises a mixture of about 75 to 80% of a neutral gas and the remainder comprises CO2.

8. The device according to claim 7, wherein the neutral gas comprises argon.

9. The device according to claim 1, further including a means for measuring the oxygen level in the overhead gas.

10. The device according to claim 1, further including means for adjusting the pressure of the inerting gas.

11. A device for inerting a vat having an upper wall and a single upper opening and containing a consumable liquid and an overhead gas, said device comprising:
    a downward extending injection tube having an upper end adapted to be connected to said upper opening of the vat and a lower end extending close to a free surface of the consumable liquid in the vat;
    a tubular connector adapted to be fitted onto the upper opening of the vat, said connector having an inlet for passage of an inerting gas, an outlet for passage of the overhead gas and a side wall enclosing an upper portion of the injection tube, the side wall being provided with an orifice to purge the overhead gas, and
    a means for measuring the oxygen level in the overhead gas.

12. In combination, (1) a vat having an upper wall and a single upper opening and containing a consumable liquid and an overhead gas, and (2) a device for inerting said vat, the device comprising:
    a downward extending injection tube having an upper end connected to said upper opening of the vat and a lower end extending close to a free surface of the consumable liquid in the vat;
    a tubular connector fitted onto the upper opening of the vat, said connector having two concentric passages comprising an inlet for passage of an inerting gas, and an outlet for passage of the overhead gas and a side wall enclosing an upper portion of the injection tube, the side wall being provided with an orifice to purge the overhead gas, and
    a gas diffuser at the lower end of the injection tube.

13. The combination or claim 12, wherein the consumable liquid is wine and the inerting gas comprises a mixture of argon and carbon dioxide.

14. The combination of claim 12, wherein the gas diffuser has a lower end closed off by a horizontal plate larger than the cross section of the injection tube and the inerting gas is injected through a perforated portion of the diffuser above the horizontal plate.

* * * * *